(12) United States Patent
Leap

(10) Patent No.: US 6,415,972 B1
(45) Date of Patent: Jul. 9, 2002

(54) CLOSED LOOP SOLDER WAVE HEIGHT CONTROL SYSTEM

(75) Inventor: Gerald L. Leap, Tunas, MO (US)

(73) Assignee: Speedline Technologies, Inc., Franklin, MA (US)

(*) Notice: Subject to any disclaimer, the term of this patent is extended or adjusted under 35 U.S.C. 154(b) by 2 days.

(21) Appl. No.: 09/585,934

(22) Filed: Jun. 2, 2000

Related U.S. Application Data

(60) Provisional application No. 60/137,182, filed on Jun. 2, 1999.

(51) Int. Cl.$^7$ .............................................. B23Q 16/00
(52) U.S. Cl. ........................... 228/102; 228/49.5; 228/7
(58) Field of Search ................................. 228/102, 103, 228/180.1, 254, 260, 9, 37, 7, 8, 11

(56) References Cited

U.S. PATENT DOCUMENTS

| | | | |
|---|---|---|---|
| 3,848,864 A | * 11/1974 | Dwyer et al. | |
| 4,447,001 A | 5/1984 | Allen et al. | 228/37 |
| 4,563,643 A | * 1/1986 | Leschek et al. | |
| 4,632,291 A | 12/1986 | Rahn et al. | 228/9 |
| 4,666,077 A | 5/1987 | Rahn et al. | 228/37 |
| 4,890,781 A | * 1/1990 | Johnson et al. | |
| 5,292,055 A | * 3/1994 | Gileta | |
| 5,388,468 A | 2/1995 | Sasson | 73/865.9 |
| 5,533,663 A | 7/1996 | Massini, Jr. et al. | 228/103 |
| 5,538,175 A | * 7/1996 | Massini, Jr. et al. | |
| 5,572,119 A | * 11/1996 | Taylor | |
| 5,611,475 A | 3/1997 | Sim | 228/40 |
| 5,617,988 A | * 4/1997 | Willemen | |
| 5,794,837 A | 8/1998 | Cottingham et al. | 228/37 |
| 5,889,200 A | 3/1999 | Centers et al. | 73/53.01 |
| 5,901,899 A | 5/1999 | Flache | 228/37 |
| 5,967,398 A | * 10/1999 | Fritz, Sr. | |
| 5,979,740 A | * 11/1999 | Rooks | |
| 6,123,248 A | * 9/2000 | Tadauchi et al. | |
| 6,138,890 A | * 10/2000 | Kanno et al. | |
| 6,223,969 B1 | * 5/2001 | Leturmy | |
| 6,273,319 B1 | * 8/2001 | Ichikawa et al. | |

* cited by examiner

*Primary Examiner*—Tom Dunn
*Assistant Examiner*—Jonathan Johnson
(74) *Attorney, Agent, or Firm*—Mintz, Levin, Cohn, Ferris, Glovsky and Popeo, P.C.

(57) ABSTRACT

An apparatus for processing printed circuit boards including a system for measuring and controlling solder wave height generally comprises conveyor system for transporting printed circuit board through a number of processing stations. The system for measuring and controlling the wave height of solder includes a sensor which is mounted in close proximity to the interface defined between the surface of the solder wave and the bottom surface of the printed circuit board. The sensor is coupled to a micro-controller and the micro-controller is coupled to a pump motor. The pump motor is coupled to a solder bath which generates the solder wave and is controlled to operate at a predetermined speed to maintain a predetermined solder wave height during the process of wave soldering printed circuit boards. The sensor provides a number voltages to the micro-controller representing the distance between the sensor and the top surface of the solder wave. The voltages are converted into a number of values. The micro-controller includes a comparator which receives the values and compares the values to a predetermined set point to determine whether the solder wave height is too high or to low and the micro-controller further determines whether to respectively decreased or increased the speed of the pump motor.

12 Claims, 3 Drawing Sheets

CLOSED LOOP SOLDER WAVE HEIGHT CONTROL SYSTEM

RELATED APPLICATION

This application claims priority from Provisional Application No. 60/137,182 filed Jun. 2, 1999, which is herein incorporated by reference.

FIELD OF THE INVENTION

Generally, the invention relates to an apparatus and method for manufacturing printed circuit boards and for assisting the process of soldering metals to integrated circuit boards. More specifically, the invention relates to a system for measuring and controlling the height of a solder wave that will provide more consistent soldering applications during the manufacturing process.

BACKGROUND

Generally speaking, in a wave soldering machine a printed circuit board (PCB) is moved by conveyor on an inclined path past a fluxing station, a preheating station, and, finally, a station at which a wave of solder is caused to well upwardly and contact various portions of the PCB to be soldered. The efficiency of this wave soldering process is affected by a number of concerns, two of which are known in the art as the "contact-area" and the "dwell-time." The dwell-time represents the amount of time any given area of the PCB is in actual contact with the solder. Generally, the dwell-time is related to the contact-area and can be determined by simply dividing the length of the contact-area, which is in the direction of travel, by the speed of the conveyor belt.

The contact-area represents that portion of the PCB that is in actual contact with the solder wave, i.e., the area of the PCB that is currently covered by the solder wave. It is preferable to have a contact-area that is uniform, i.e., not uneven. A uniform contact-area is one where the dwell-time is the same for all portions of the PCB. For example, for a rectangular shape all portions of the PCB perpendicular to the direction of motion enter, and leave, the solder wave at approximately the same time. However, if the contact-area is not uniform, then some portions of the PCB are within the solder bath longer than other portions, i.e., the dwell-time changes across the PCB. For example, if the contact-area is trapezoidal (with the parallel sides in the direction of travel), one side of the PCB maintains contact with the solder longer than the opposite side. If the dwell-time is too short, the soldering process may not be completed. On the other hand if the dwell-time is too long, the PCB may become too soft and begin to sag, or solder may go up through the apertures of the PCB due to strong capillary action, which could result in solder bridges forming on the component side of the board.

One method for measuring the solder wave contact-area and the dwell-time is to use a tempered glass plate that is passed over the solder wave during a "test pass." This glass plate has a set of grid lines of known dimensions. As the glass plate passes over the solder wave, the contact-area is visually observed, and approximately measured via the grid lines, by an operator of the solder wave machine. From the observed contact-area, the dwell-time is determined by dividing the length of the contact-area, i.e., that dimension in the direction of motion of the conveyor belt, by the speed of the conveyor belt.

Unfortunately, this method for measuring the contact-area is purely subjective and only yields an approximation of the contact-area. In addition, in order to observe the contact-area on the glass plate, the wave soldering machine conveyor speed must be slowed so that the operator has time to observe the glass plate.

Other problems occur when the height of the solder wave that comes in contact with the PCB is not at an optimum level. If the wave height is too high, solder will flow on the top surface of the PCB and ruin the board or at least cause the PCB to fail. If the height of the solder wave is too low, some of the components may not be soldered appropriately and the PCB may fail or at least fail prematurely in time.

Employees are often reprimanded if they adjust the height of the wave to high whereby the solder flow gets onto the top surface of the PCB. Thus many employees, tend to adjust the wave height too low thereby giving inconsistent solder to the bottom of the PCB.

Therefore, a unsolved need exists for an apparatus and method for processing PCBs and for assisting the process of soldering metals to PCBs, which overcomes limitations and deficiencies of the prior art.

SUMMARY OF THE INVENTION

One object of the present invention is to provide an apparatus and method for processing printed circuit boards and for assisting the process of soldering metals to integrated circuit boards.

Another object of the present invention is to provide a system for measuring and controlling the height of a solder wave that will provide more consistent soldering applications during the printed circuit board manufacturing process.

In accordance with principles of the present invention, an apparatus for processing printed circuit board is set forth having a system for measuring and controlling the height of a solder wave which is generated by a solder bath associated with the printed circuit board manufacturing process. The apparatus for processing printed circuit boards includes a conveyor system for transporting printed circuit boards through a number of processing stations. The conveyor system includes a pair of elongated longitudinal conveyor rails which are oriented parallel with respect to each other. The conveyor further includes a plurality of pairs of printed circuit board gripping fingers which are mounted on a drive belt defined on each of the rails. Each pair of gripping fingers are oriented to face each other for enabling the gripping fingers to securely grip opposing edge regions of a printed circuit board for transporting the printed circuit board through a number of processing stages including the wave soldering process.

In an embodiment, the system for measuring and controlling the solder wave height defined in the wave soldering process includes a sensor which is mounted in close proximity to the top surface of the solder wave. The sensor is coupled to a micro-controller, via sensor electronics, and the micro-controller is coupled to a pump motor. The pump motor is coupled to the solder bath and generates the solder wave by controlling the pump motor to operate at a predetermined revolution-per-minute to maintain a predetermined solder wave height during the process of wave soldering printed circuit boards.

The sensor can be mounted in a preformed aperture formed on one of the rails, which is defined in close proximity to the top surface of the solder wave. In this orientation, the sensor can communicate with the top surface of the solder and generate an analog voltage sample representing the distance between the sensor and the top surface of the solder wave. The analog voltage sample is communicated to the micro-controller and is converted into a predetermined value, which is relative to the distance between the top surface of the solder and the bottom surface of the printed circuit board. The micro-controller includes a comparator, which receives the value and compares the value to a predetermined set point. If the value is too high, the micro-controller controls the pump motor to reduce the speed of the motor and if the value is too low, the micro-controller controls the pump motor to increase the speed of the motor.

In an embodiment, the micro-controller further includes a register. The register is adapted to receive a plurality of values. The values represent a plurality of distance samples which are each relative to a distance defined between the top surface of the solder wave and the bottom surface of the printed circuit board. The values contained in the register can be averaged to provide an average distance defined between the top surface of the solder wave and the bottom surface of the printed circuit board. The comparator receives the average value and compares the average value to the predetermined set point to determine whether the solder wave height is too high or to low and to respectively decreases or increases the speed of the pump motor similarly to that previously described.

A method of using the apparatus for processing printed circuit boards including the system for measuring and controlling the wave height of solder comprises the steps of turning on the apparatus for processing printed circuit boards and pausing momentarily for the pump motor to form a solder wave having a predetermined solder wave height; sampling a plurality of analog voltage samples; providing the analog voltage samples to a micro-controller for enabling the micro-controller to convert the analog voltage samples to a plurality of values; providing the values to a register; determining an average value from the plurality of values defined in the register; comparing the average value with a predetermined set point to determine if the average value is within a predetermined tolerance range of the set point, if the average value is within the predetermined tolerance range of the set point, then repeating the steps of determining an average value and comparing the average value with a predetermined set point, and if the average value is not within the predetermined tolerance range of the set point, then determining whether the average value is too high or too low; and controlling the pump motor speed to adjust the solder wave height which is associated with the pump motor.

BRIEF DESCRIPTION OF THE DRAWINGS

The foregoing and other objects of this invention, the various features thereof, as well as the invention itself, can be more fully understood from the following description when read together with the accompanying drawings in which.

DETAILED DESCRIPTION OF THE PREFERRED EMBODIMENTS

The present invention provides an apparatus and method for processing printed circuit boards including a system for measuring and controlling a solder wave height generated by a solder bath which is applied to the printed circuit board during processing.

Figure 1:
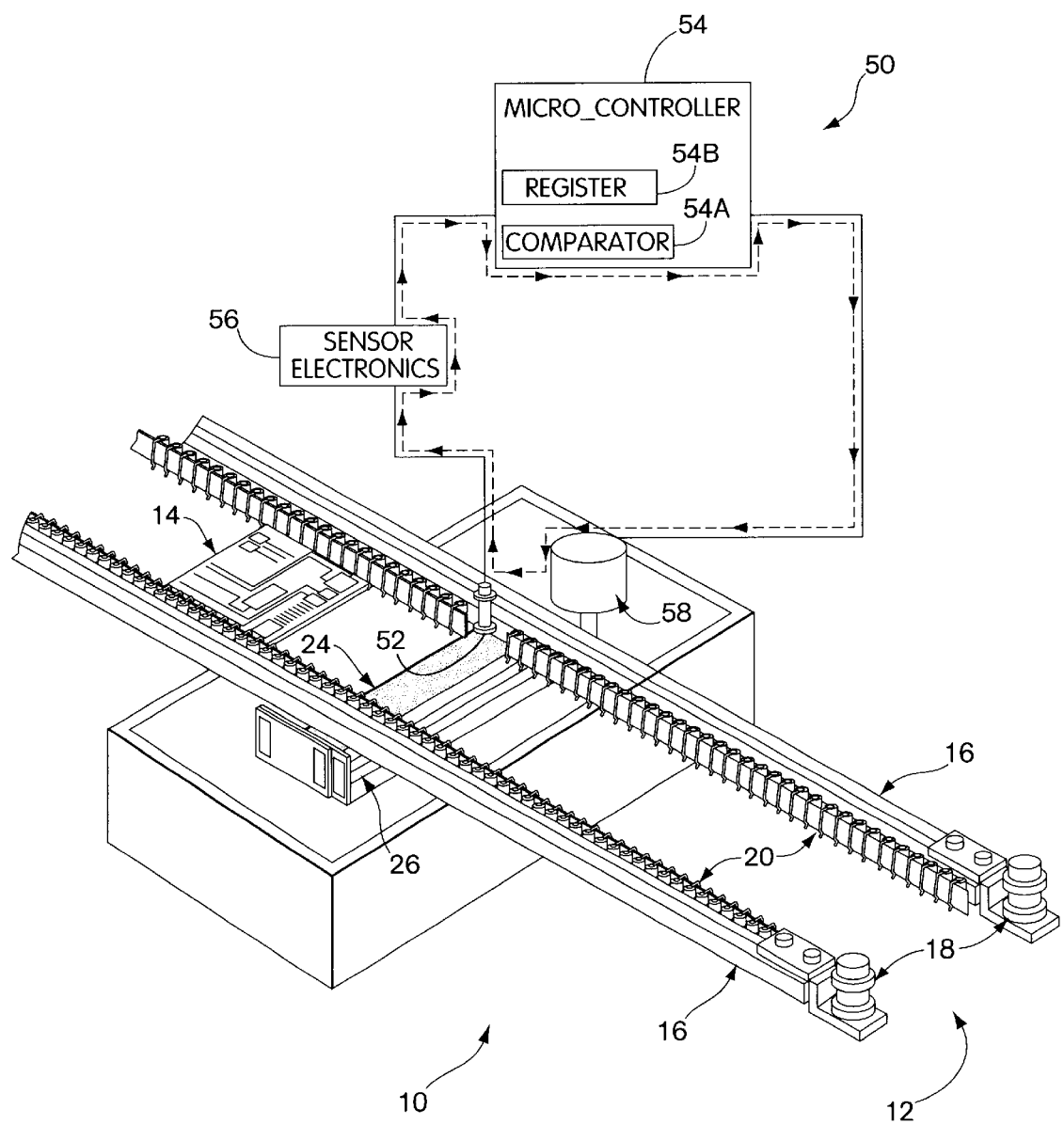
FIG. 1 is a partial isometric view of an apparatus for processing printed circuit boards having principles of the present invention.

Referring to FIG. 1, in one embodiment of the present invention, an apparatus for processing printed circuit boards 10 which includes a system 50 for measuring and controlling solder wave height comprises conveyor system 12 for transporting printed circuit board 14 through a number of processing stations. Conveyor system 12 typically includes a pair of elongated longitudinal conveyor rails 16 oriented parallel with respect to each other. Conveyor rails 16 each have a number of pulleys 18 mounted thereon, whereby at least one of the pulleys 18 is motorized by, for example, one or more electric motors (not shown). Drive belts 20 are mounted on the pulleys 18 associated with each rail 16 so that when rotational motion is transposed to the pulleys 18 by the motor, drive belts 20 move linearly.

Figure 2:
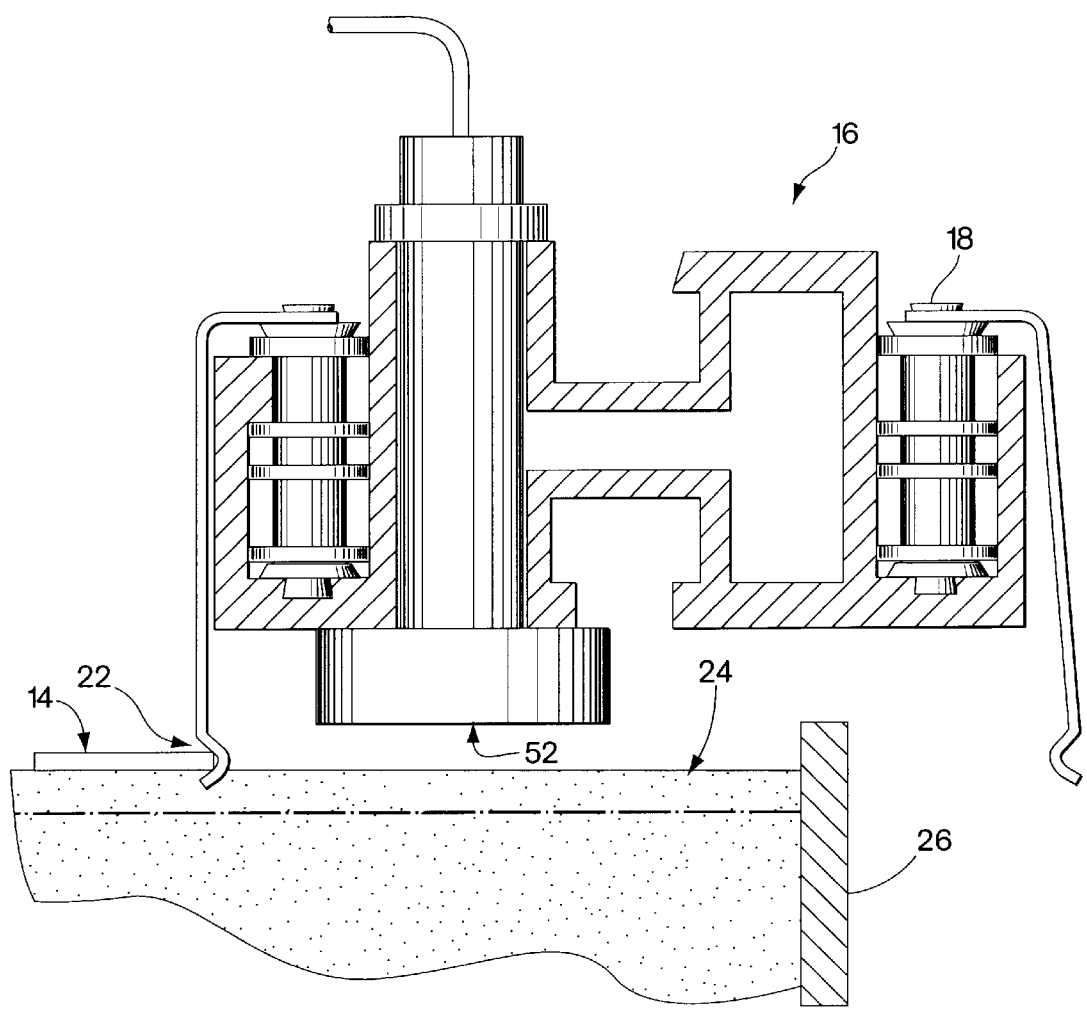
FIG. 2 is a partial cross-sectional view of the apparatus for processing printed circuit boards shown in FIG. 1.

Referring further to FIG. 2, the apparatus for processing printed circuit boards 10 further includes a plurality of pairs of printed circuit board gripping fingers 22 which are each mounted on opposing belts so that each pair of gripping fingers 22 face each other. The gripping fingers 22 are adapted to securely grip the opposing edge regions of printed circuit board 14 for transporting the printed circuit board 14 through a number of processing stages including the wave soldering process. In the wave soldering process, the printed circuit board 14 is moved through a solder wave 24 generated by a solder bath 26 so that a bottom portion of the printed circuit board 14 skims the top surface of the solder wave 24. A capillary effect enables a predetermined portion of the bottom surface of the board 14 to receive and retain the solder.

The system 50 for measuring and controlling the solder wave 24 height includes a sensor 52 which is mounted in close proximity to the surface of the solder wave 24. The sensor 52 is coupled to a micro-controller 54, via sensor electronics 56, and the micro-controller 54 is coupled to a pump motor 58. The pump motor 58 is coupled to the solder bath 26 which generates the solder wave 24 and is controlled to operate at a predetermined revolution-per-minute ("r.p.m.") to maintain a predetermined solder wave 24 height during the process of wave soldering printed circuit boards 14.

In an embodiment, the sensor 52 is defined as an eddy current displacement sensor 52 which can be provided by Micro-Epsilon of Raleigh, N.C. The sensor 52 can be mounted in a preformed aperture (not shown) formed on one of the rails 16, which positions the sensor 52 in close proximity to the top surface of the solder wave 24. In this orientation, the sensor 52 can communicate with the top surface of the solder wave 24 and generate an analog voltage sample representing the distance between the sensor 52 and the top surface of the solder wave 24. The analog voltage sample is communicated to the micro-controller 54, via sensor electronics 56, and is converted into a predetermined value which is relative to the distance between the top surface of the solder wave 24 and the bottom surface of the printed circuit board 14. The micro-controller 54 includes a comparator 54a which receives the value and compares the value to a predetermined set point.

If the compared value is greater than the set point and exceeds a predetermined tolerance range, which indicates that the solder wave 24 height is too high with respect to the bottom surface of the printed circuit board 14, then the micro-controller 54 controls the pump motor 58 to decrease the r.pm.s or speed thereof. Reducing the speed of the pump motor 58 will proportionately reduce the solder wave 24 height relative to the bottom surface of the printed circuit board 14. If the compared value is less than the set point and is below a predetermined tolerance range, which indicates that the solder wave 24 height is too low with respect to the bottom surface of the printed circuit board 14, the micro-controller 54 controls the pump motor 58 to increase the speed of the pump motor 58. Increasing the speed of the pump motor 58 will proportionately increase the solder wave 24 height relative to the bottom surface of the printed circuit board 14.

In an embodiment, the micro-controller 54 further includes a register 54b, such as a linear-shift-register ("LSR") 54b. The LSR 54b is adapted to receive a plurality of values from the micro-controller 54. The values represent a plurality of sampled distances which are each relative to a distance defined between the top surface of the solder wave 24 and the bottom surface of the printed circuit board 14. As updated values are provided to the LSR 54b, older values are discarded, which enables the LSR 54b to maintain relatively recent values. The values contained in the LSR 54b can be averaged to provide an average distance defined between the top surface of the solder wave 24 and the bottom surface of the printed circuit board 14. The comparator 54a receives the average value and compares the average value to the predetermined set point to determine whether the solder wave 24 height is too high or to low and to respectively decreases or increases the pump motor 58 similarly to that previously described.

In an embodiment, the LSR 54b can be averaged when the number of values contained therein reaches a predetermined LSR-threshold value. For example, when the apparatus for processing printed circuit boards 10 commences and the pump motor 58 is initially turned on, the solder wave 24 height can greatly fluctuate. Therefore, the LSR-threshold value can be set low, e.g. at 15-values. A relatively low LSR-threshold value, such as 15-values, will cause the LSR 54b to be averaged after 15-values have been received from the micro-controller 54. In this respect, a relatively short duration will pass before the pump motor 58 speed will be corrected as a result of the solder wave 24 height being too high or too low. Thus, during initial start-up of the apparatus for processing printed circuit boards 10, the pump motor 58 speed and associated wave solder 24 height can be rapidly adjusted to maintain the wave solder 24 height within a predetermined tolerance range of a predetermined set point.

On the other hand, after the apparatus for processing printed circuit boards 10, including the pump motor 58 and associated wave solder 24 height have settled to an operational status, the LSR-threshold value can be set relatively high, e.g. at 100-value. Setting the LSR-threshold relatively high, such as a 100-value, will cause the LSR to be averaged after 100-values have been received from the micro-controller 54. In this respect, a relatively long duration will pass before the pump motor 58 speed will be corrected as a result of the solder wave 24 being too high or too low. Increasing the LSR-threshold value also increases the accuracy of the average value derived therefrom. Therefore, in increasing the LSR-threshold, the pump motor 58 speed and associated solder wave 24 height can be slowly and accurately adjusted or fine-tuned to maintain the solder wave 24 height with predetermined tolerances of the predetermined set point.

Figure 3:
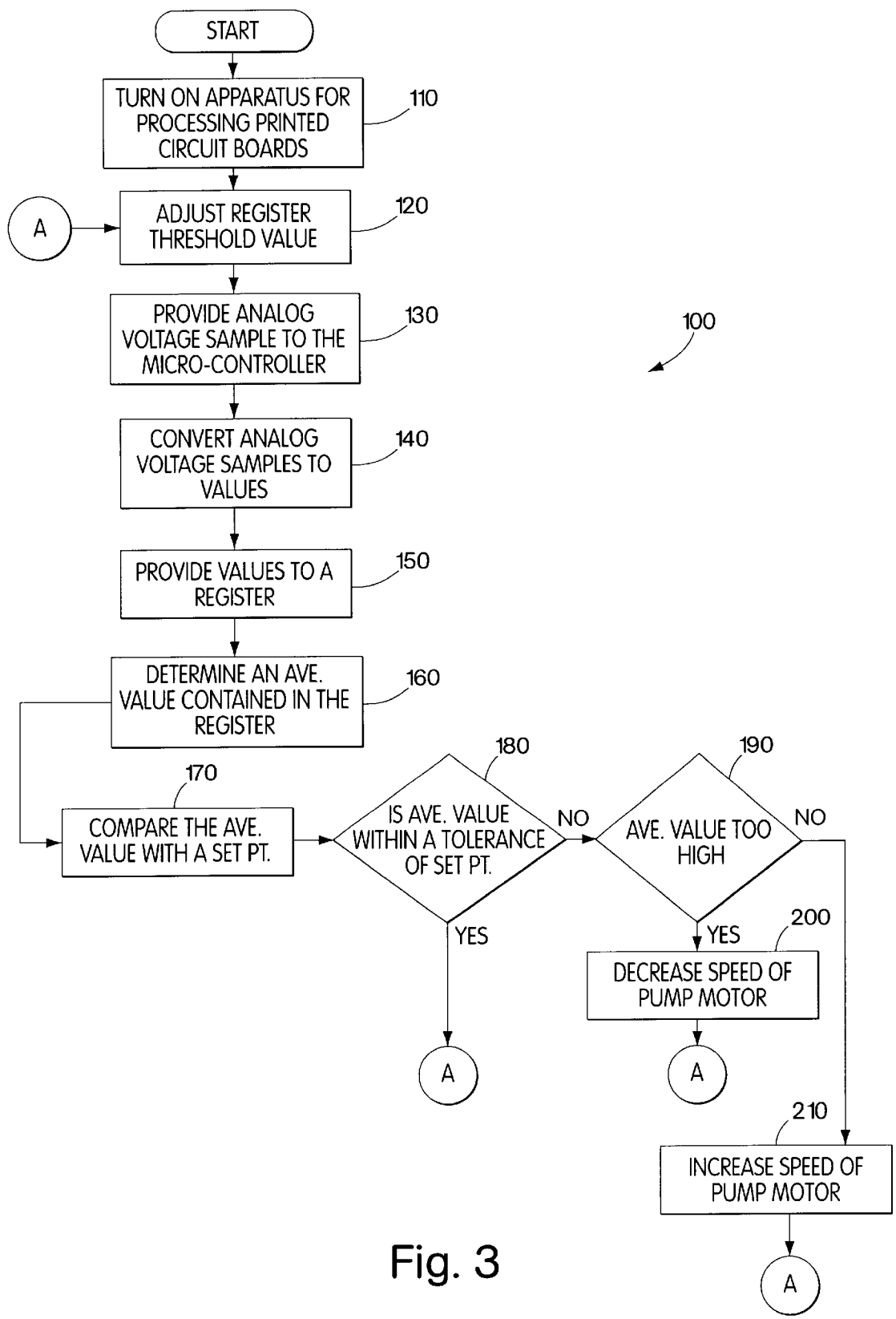
FIG. 3 is a flow chart showing method steps executable on the apparatus for processing printed circuit boards shown in FIG. 1.

Referring to FIG. 3, a method 100 of using the apparatus for processing printed circuit boards 10 including a system 50 for measuring and controlling the solder wave 24 height comprises the steps of a user, at step 110 turning on the apparatus and pausing momentarily for the pump motor 58 to form the solder wave 24 to enable the printed circuit 14 wave soldering process to commence. At step 120, the user can adjust the LSR-threshold value to a relatively low value during initial process start-up to increase the number of times the pump motor 58 speed will be adjusted for enabling the solder wave 24 height to be rapidly adjusted. After the apparatus reaches operational status, the user can adjust the LSR-threshold value to a relatively high value to decrease the number of times the pump motor 58 speed will be adjusted for enabling the solder wave 24 height to be slowly adjusted or fine-tuned.

At step 130, the sensor can provide analog voltage samples to the micro-controller 54, which can be converted to a plurality of values at step 140. The values are provided to the LSR 54b, at step 150, and an average value is determined at step 160. The average value is compared with a predetermined set point, at step 170, to determine if the average value is within a predetermined tolerance range of the set point. If the average value is within the predetermined tolerance range of the set point at step 180, then the above process of providing values to the LSR 54b, determining an average value and comparing the average value with the set point is repeated. If the average value is determined not within the predetermined tolerance range of the set point at step 180, a determination is made as to whether the average value is too high or too low, at step 190. If the average value is too high, which indicates that the solder wave is too high, the speed of the pump motor 58 is decreased, at step 200, to reduce the solder wave 24 height. Conversely, if the average value is too low, which indicates that the solder wave 24 height is too low, the speed of the pump motor 58 is increased, at step 210, to increase the solder wave 24 height. The above process steps can be cyclically repeated while the apparatus for processing printed circuit boards is in operation.

What is claimed is:

1. An apparatus for processing printed circuit boards having a system for measuring and controlling a solder wave height generated by a solder bath, comprising:
   a conveyor system for transporting printed circuit boards through a number of processing stations, the conveyor system including a pair of elongated conveyor rails which are oriented parallel with respect to each other;
   a plurality of pairs of printed circuit board gripping fingers which are mounted on a drive belt defined on each of the rails, each pair of gripping fingers being oriented to face each other for enabling the gripping fingers to securely grip opposite edge regions of a printed circuit board for transporting the printed circuit board through a number of processing stages;
   an eddy current displacement sensor mounted in close proximity to the top surface of the solder wave generated by the solder bath;
   a pump motor coupled to the solder bath;
   a micro-controller coupled to the pump motor,
   wherein the sensor provides a plurality of analog voltage samples to the micro-controller which are converted into a plurality of values, the values representing the distance between the top surface of the solder wave and the bottom surface of the printed circuit board.

2. The apparatus for processing printed circuit boards of claim 1, wherein the micro-controller further includes a comparator, the comparator receives the values and compares the values to the predetermined set point.

3. The apparatus for processing printed circuit boards of claim 2, wherein the micro-controller further includes a register for receiving the values, the register cooperating with the micro-controller to average the values contained in the register to provide an average value, the average value being compared to the set point.

4. The apparatus for processing printed circuit boards of claim 3, wherein the register is a linear-shift register.

5. The apparatus for processing printed circuit boards of claim 4, wherein the sensor is mounted in a preformed aperture formed on one of the rails, the sensor being defined in close proximity to the top surface of the solder wave.

6. An apparatus for processing printed circuit boards, comprising:

a pump motor coupled to a solder bath to form a solder wave having a solder height in the solder bath;

an eddy current displacement sensor operably coupled to the solder bath and configured to provide a plurality of voltage samples corresponding to the height of the solder wave;

a micro-controller coupled to the pump motor;

wherein the micro-controller is programmed to compare an average value of the voltage sample with a predetermined set point to obtain a comparison result, and control the pump motor speed to adjust the solder wave height based on the comparison result.

7. The apparatus of claim 6, wherein the micro-controller is further programmed to determine an updated average value, and compare the updated average value with the predetermined set point.

8. The apparatus of claim 7, further comprising one or more conveyor rails coupled to the apparatus to transport the printed circuit boards;

wherein the sensor is mounted in a preformed aperture formed on one of the conveyor rails, the sensor being defined in close proximity to a top surface of the solder wave.

9. An apparatus for processing printed circuit boards including a system for controlling a solder wave height generated by a solder bath, comprising:

a pump motor coupled to the solder bath;

an eddy current displacement sensor configured to provide a plurality of samples corresponding to a height of the solder wave; and means for comparing the plurality of samples with a predetermined set point to provide a comparison result and for controlling the pump motor speed to adjust the solder wave height.

10. The apparatus of claim 9, further comprising means for converting the plurality of samples into digital values.

11. The apparatus of claim 9, further comprising a register configured to store the digital values.

12. The apparatus of claim 11, further comprising one or more conveyor rails coupled to the apparatus to transport the printed circuit boards;

wherein the sensor is mounted in a preformed aperture formed on one of the conveyor rails, the sensor being defined in close proximity to a top surface of the solder wave.

* * * * *